United States Patent
Enning et al.

(10) Patent No.: US 9,925,890 B2
(45) Date of Patent: Mar. 27, 2018

(54) MOTOR VEHICLE AND RECEIVING DEVICE FOR RECEIVING ELECTRICAL ENERGY STORAGE CELLS

(71) Applicant: AUDI AG, Ingolstadt (DE)

(72) Inventors: Norbert Enning, Denkendorf (DE); Ralf-Gerhard Willner, Berlin (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/324,090

(22) PCT Filed: Jun. 29, 2015

(86) PCT No.: PCT/EP2015/001307
§ 371 (c)(1),
(2) Date: Jan. 5, 2017

(87) PCT Pub. No.: WO2016/008567
PCT Pub. Date: Jan. 21, 2016

(65) Prior Publication Data
US 2017/0203668 A1 Jul. 20, 2017

(30) Foreign Application Priority Data
Jul. 15, 2014 (DE) ........................ 10 2014 010 491

(51) Int. Cl.
*B60K 1/04* (2006.01)
*B60L 11/18* (2006.01)
(Continued)

(52) U.S. Cl.
CPC ............ *B60L 11/1877* (2013.01); *B60K 1/04* (2013.01); *H01M 2/1077* (2013.01);
(Continued)

(58) Field of Classification Search
CPC .............. B60K 1/04; B60K 2001/0405; B60K 2001/0422; B60K 2001/0438;
(Continued)

(56) References Cited

U.S. PATENT DOCUMENTS 2,314,603 A * 3/1943 Sorensen ............... B62D 21/06
280/794
5,501,289 A * 3/1996 Nishikawa ............... B60K 1/04
180/65.1
(Continued)

FOREIGN PATENT DOCUMENTS

DE 10 2005 038 153 A1 2/2007
DE 10 2009 040 197 A1 3/2011
(Continued)

OTHER PUBLICATIONS

International Preliminary Report on Pantentability dated Jun. 2, 2016 of corresponding application No. PCT/EP2015/001307; 22 pgs.
(Continued)

*Primary Examiner* — James A Shriver, II
*Assistant Examiner* — Steve Clemmons
(74) *Attorney, Agent, or Firm* — Maier & Maier, PLLC (57) ABSTRACT

A vehicle having electrical storage devices with at least one of several electrical energy storage cells for supplying electrical energy to at least one vehicle-side consumer of electrical energy. At least one receiving device that is or can be arranged in the subfloor of the vehicle for accommodation of electrical energy storage cells, which include at least two separate receiving parts for accommodation of electrical energy storage cells. At least two receiving parts are connected to at least one connecting bar extended between them, wherein in and/or on the at least one connecting bar at least one line connection is formed for electrical connec- (Continued)

tion of the energy storage cells accommodated in the respective receiving parts and/or at least one line connection for guiding a temperature-control fluid to control temperature in the energy storage cells accommodated in the respective receiving parts.

9 Claims, 5 Drawing Sheets

(51) Int. Cl.
*H01M 2/10* (2006.01)
*B60K 1/00* (2006.01)

(52) U.S. Cl.
CPC ..... *H01M 2/1083* (2013.01); *B60K 2001/005* (2013.01); *B60K 2001/0438* (2013.01); *B60L 11/187* (2013.01); *H01M 2220/20* (2013.01)

(58) Field of Classification Search
CPC ........ B62D 21/02; B62D 21/17; B62D 21/06; H01M 2/1077; H01M 2/1083; B60L 11/1877; B60L 11/1879
See application file for complete search history.

(56) References Cited

U.S. PATENT DOCUMENTS

| | | | | |
|---|---|---|---|---|
| 6,270,153 | B1* | 8/2001 | Toyao | B62D 21/06 296/204 |
| 7,641,236 | B2* | 1/2010 | Yasuhara | B62D 21/06 280/781 |
| 8,182,393 | B2* | 5/2012 | Gillingham | B60K 1/04 477/10 |
| 8,839,895 | B2* | 9/2014 | Kato | B60K 1/04 180/68.5 |
| 8,978,617 | B2* | 3/2015 | Matsuda | F02B 77/00 123/198 E |
| 9,085,226 | B2* | 7/2015 | Matsuda | B60K 1/04 |
| 9,096,117 | B2* | 8/2015 | Matsuda | B60K 6/40 |
| 9,321,338 | B2* | 4/2016 | Naruke | B62D 25/20 |
| 9,499,205 | B1* | 11/2016 | Elia | B62D 21/15 |
| 2010/0163322 | A1* | 7/2010 | Stefani | B60L 11/005 180/65.21 |
| 2010/0314182 | A1 | 12/2010 | Crain et al. | |
| 2012/0055725 | A1* | 3/2012 | Mizoguchi | B60K 1/04 180/68.5 |
| 2012/0212009 | A1* | 8/2012 | Ishizono | B62D 25/025 296/193.07 |
| 2012/0312612 | A1 | 12/2012 | Harrison, III et al. | |
| 2013/0133961 | A1 | 5/2013 | Matsuda et al. | |
| 2013/0248268 | A1 | 9/2013 | Matsuda et al. | |
| 2014/0338999 | A1* | 11/2014 | Fujii | B60K 1/04 180/68.5 |
| 2016/0087256 | A1* | 3/2016 | Wagner | H01M 2/1077 429/99 |

FOREIGN PATENT DOCUMENTS

| | | | | |
|---|---|---|---|---|
| DE | 10 2010 034 925 A1 | 2/2012 | | |
| DE | 10 2013 208 682 A1 | 11/2014 | | |
| DE | 102013208682 A1 * | 11/2014 | ......... | H01M 2/1072 |
| DE | 10 2013 215 436 A1 | 3/2015 | | |
| JP | 2004345448 A * | 12/2004 | | |
| JP | 2004345448 A | 12/2004 | | |
| JP | 2006218894 A * | 8/2006 | ......... | H01M 8/2475 |

OTHER PUBLICATIONS

German Office Action dated Mar. 9, 2015 of corresponding application No. DE10 2014 010 491.5; 6 pgs.
International Search Report and Opinion dated Oct. 7, 2015 of corresponding application No. PCT/EP2015/001307; 11 pgs.
International Preliminary Report on Pantentability dated Jun. 2, 2016 of corresponding application No. PCT/EP2015/001307; 16 pgs.
Notification of Transmittal of Translation of the International Preliminary Report on Patentability dated Jan. 19, 2017, in connection with corresponding International Application No. PCT/EP2015/001307 filed Jun. 29, 2015 (6 pgs.).
Chinese Office Action, dated Nov. 15, 2017, in corresponding Chinese Application No. 2015800384080; 7 pages.

* cited by examiner

MOTOR VEHICLE AND RECEIVING DEVICE FOR RECEIVING ELECTRICAL ENERGY STORAGE CELLS

BACKGROUND

The invention relates to a motor vehicle comprising at least one of several electrical storage cells comprising an electrical energy storage device for supplying electrical energy to at least one consumer of electrical energy on the side of the motor vehicle.

It is known that motor vehicle-side consumers of electrical energy, under which term is to be understood in particular also a drive unit or parts thereof forming electrical machines, can be or are supplied with electrical energy from at least one energy storage device built on the side of the motor vehicle. Such devices for storage of electrical energy generally include a number of electrically interconnected energy storage cells. According to a popular design form for such an electrical storage device, an electrical storage unit is formed from several lithium-based energy storage cells. The energy storage cells forming the electrical storage unit are typically accommodated in a receiving device in an energy storage device housing.

What needs to be improved in the existing technology described above is that the fact that the receiving device usually takes up a significant amount of space, which is in any case scarce on the vehicle-side. Therefore, only a limited number of arrangement possibilities are available for such receiving devices.

SUMMARY OF THE DISCLOSURE

The object of the invention is to provide an improved motor vehicle, in particular with regard to a compact, vehicle-side arrangement of at least one corresponding energy storage device.

This object is achieved with a motor vehicle of the type mentioned in the introduction, characterized in that it comprises a receiving device for receiving electrical energy storage cells that can be or is arranged in the subfloor of the motor vehicle, which is provided with at least two separated receiving parts for receiving electrical storage cells, wherein the at least two receiving parts are connected via at least one connection bar extended between them, wherein in and/or on the at least one connection bar is formed at least one line connection for the electrical energy storage cells accommodated in respective receiving parts, and/or at least one line connection is created for guiding a temperature-control fluid for temperature control of the energy storage cells accommodated in the respective receiving parts.

The motor vehicle according to the invention comprises at least one electrical storage device for supplying electrical energy to an electrical energy consumer on the side of the motor vehicle. The consumer of electrical energy from an electrical energy storage device as used below can be both a so called high-voltage consumer, such as for example a drive unit or a part thereof forming an electrical machine, and a low-voltage consumer, such as for example multimedia or air conditioning devices. The energy storage device includes multiple energy storage cells, formed for example from lithium or connected to lithium, or it is formed from such cells. A certain number of respective energy storage energy cells is typically provided with a modular design, which is to say for example as an energy storage device module having a cuboidal form, shortened as cell module.

The energy storage cells are accommodated in a receiving device. An important fact about the receiving device is that it consists of at least two separate receiving parts.

Each receiving part is equipped with a certain number of energy storage cells. Each of the receiving parts is structurally designed so that it can accommodate a certain number of energy storage cells therein. The receiving parts can be therefore called or considered as parts of the energy storage cells to be accommodated in respective housing parts. The same or different number of energy storage cells can be received in these receiving parts. The energy storage cells forming the construction of the energy storage device can thus be divided equally or unequally over the corresponding receiving parts. In general, each receiving part is adapted to receive at least one energy storage cell. The energy storage cells respectively accommodated in one receiving part are mutually electrically connected or interconnected through a suitable electrical connection means, for example in the form of conductor rails.

The receiving parts can be or are arranged in the subfloor of the motor vehicle. Under the term subfloor of the motor vehicle should be understood the region of the motor vehicle facing directly the ground, which is to say typically a roadway. It is advantageous when the subfloor is provided with separate areas or arrangements for the placement of respective receiving parts, which will be discussed in more detail below.

The receiving part are typically symmetrical structural components. The symmetrical axis of the receiving parts is formed during the state when they are arranged in the subfloor of the vehicle typically along the longitudinal central axis of the motor vehicle. The receiving parts are thus in particular present as mirror-symmetrical structural element, namely as so called right-left parts.

In principle, each receiving part is provided in the state when it is arranged in receiving device in the subfloor of the motor vehicle so that it is arranged in the bottom side facing the road surface and at an angle, in particular vertically, relative to the protruding walls. The bottom side can be also referred to as a bottom surface, and the walls can be also considered as being the side surfaces of the respective receiving parts. The bottom side and the walls thus delimit the volume available for reception of parts enabling to accommodate energy storage cells, as well as other components, in particular electrical or electronic components of the energy storage device. Optionally, the volume available for reception on the side of the receiving part can be enclosed in the upper part above a cover element. The receiving device can thus be enclosed above a corresponding cover element, located in particular opposite the bottom side, in the state when it is arranged in the receiving device on the upper side facing the motor vehicle body.

The receiving parts are typically provided with at least one temperature-control fluid used to control the temperature, which is to say for heating or cooling, which can flow through the respective received energy storage cells. A suitable temperature-control fluid may be for example a temperature controlling fluid such as water, or temperature controlling gas such as for example carbon dioxide. The or a temperature fluid channel construction can be integrated in the bottom side and/or in the walls of a suitable receiving part, so that a corresponding receiving part can be pushed through a corresponding receiving part, at least partially, with a temperature fluid channel structure.

The receiving parts are typically arranged symmetrically with respect to the longitudinal central axis of the motor vehicle. Accordingly, at least one receiving part is typically arranged to the left of the longitudinal central axis, and at least one receiving part is typically arranged to the right of the longitudinal central axis of the motor vehicle. Relative to their longitudinal axis, which is to say the position relative to the longitudinal axis of the motor vehicle, the receiving parts are typically arranged in a region of the bottom side located below the front seat of the motor vehicle, generally in one region of the bottom side of the motor vehicle in front of the rear seat of the motor vehicle. It is particularly preferred in this case when the energy storage cells accommodated in the receiving parts are arranged directly below the front seats.

Although the receiving parts are to be considered as separate structural components, at the same time they are also interconnected with at least one connecting bars extending between them. The or a corresponding connecting bar is therefore fixed, in particular with its free end, to a first receiving part, and on the other hand, it is fixed to another receiving part, in particular with its opposite free end. The connecting bars therefore typically run parallel to the transverse axis and thus transversely to the longitudinal axis of the motor vehicle.

However, the at least one connecting bar is used not only as a mechanical connection of corresponding receiving parts, since it is functionally also designed in such a way that it enables an exchange of electrical energy and/or of a corresponding temperature-control fluid between the receiving parts, or between the energy storage cells accommodated in the respective receiving parts. A line connection is therefore created in and/or at the at least one and in and/or at least another one connecting bar with at least one line connection for guiding a temperature-control fluid in order to control the temperature in the energy storage cells accommodated in respective receiving parts. The line connection that is thus built substantially inside or outside of a connecting bar, can itself be designed to conduct electrical energy, or to guide a corresponding temperature-control fluid, or as having a special conductive structure, for example in the form of an electrical cable, or of a channel for conducting electrical energy, or for a corresponding temperature-control fluid.

Accordingly, at least one connecting bar may limit at least one channel structure for reception or formation of at least one line connection establishing an electrical connection in respective receiving parts of accommodated energy storage cells, and/or guiding a temperature-control fluid in the energy storage cells accommodated in the receiving parts. Alternatively or in addition, at one free outer face of at least one connecting bar can be arranged at least one channel structure for receiving or creating at least one line connection for an electrical connection of the energy storage cells accommodated in the respective receiving parts, and/or for guiding a temperature-control fluid to control the temperature of the energy storage cells accommodated in the receiving parts. Corresponding channel structures are extended typically in the longitudinal direction or in the connecting bars.

It goes without saying that at least one receiving part comprises suitable connections for connecting corresponding electrical consumers or a temperature controlling apparatus.

The receiving parts may be made for instance from metal or from a plastic material. The embodiment made of metal, for instance aluminum or steel, may necessitate electrical insulation of the receiving parts, which can be realized for example by means of an electrically insulating coating. Several mechanically highly stable technical plastic materials can be used for the embodiment made of a plastic material, including in particular fiber composite plastic materials.

The principle described above makes it possible in particular to provide a particularly compact arrangement or integration of a corresponding receiving device in a motor vehicle, which is to say in the body of the vehicle.

In the following will be described examples of embodiments of corresponding connecting bars, which differ only in their construction.

It is of course also possible that, as long as multiple connecting bars are used, the respective bars may be constructed according to the same or different embodiments.

According to a first example of an embodiment of a connecting bar, at least one connecting bar is formed curved, relative to its longitudinal axis or its longitudinal extension, between the receiving parts in such a way that a passageway can be created for at least one vehicle-side structural element, in particular for a vehicle-side drive train or a vehicle-side structural element forming or limited by an exhaust system. The curved construction, relative to the longitudinal axis, necessitates for example an (essentially) arcuate, or U-shaped or V-shaped form of the connecting bar. The curvature of the connecting bar can be exhibited in the direction of the subfloor in a state when the receiving device is arranged in the subfloor on the vehicle side, or in the direction of the structure of the vehicle body. Relative to the above mentioned U-shaped form, the connecting bar can be provided in the receiving device also in the U-shaped form or reversed U-shaped form in the state when it is arranged in the vehicle-side subfloor. The possible passageway can then be provided also in the direction of the roadway underside or of the structure of the vehicle body.

A connecting bar designed according to this embodiment typically does not make it possible to receive transverse forces, such as those that occur for example in the case of a lateral collision of the motor vehicle. This is because the connecting bar is adapted to become deformed in the case of a lateral collision of the motor vehicle, or to become compressed with respect to its extent between the receiving parts.

The connecting bar forms, as mentioned above, a possible passageway as a tunnel for at least one vehicle-side structural component, which extends in the direction of the longitudinal axis of the motor vehicle. This results from the arrangement of the receiving device in the subfloor of the motor vehicle, in which are typically arranged different vehicle-side structural components. These structural components include in particular parts of the drive train, such as for example drive shafts, in particular Cardan shafts, and/or parts of the exhaust system, such as for example the exhaust pipes, catalytic converters, mufflers, etc. The arrangement of the receiving devices in the subfloor of the motor vehicle takes into account also the existing structural components in the region of the subfloor in the context of structural components in motor vehicles, while building on matching them that with access options, so that matching the development of these structural components with the arrangement of corresponding receiving devices is typically no longer necessary, or it is required only marginally.

According to a second embodiment example, at least one connecting bar is provided with a recess forming a through-opening in the transverse direction to its longitudinal axis or to its longitudinal extent between the receiving parts. The recess again forms or defines a possible passageway for at least one vehicle-side structural component, in particular for a vehicle-side drive unit, or a vehicle-side component belonging to an exhaust unit. Unlike in the previously mentioned first example of an embodiment, this connecting bar is typically a planar structural component, in particular a cuboid structural component, which—similarly to a bridge—is provided with at least one recess. The at least one recess extends transversely to the longitudinal axis, or to the longitudinal extent, of the connecting bar between the receiving parts, and it thus forms or defines a corresponding possible passageway for at least one vehicle-side structural component, so that the descriptions above relating to passageway possibilities are applicable in the same way. The through-opening can be open in the direction of the road surface, or in the direction of the structure of the motor vehicle body.

A connecting bar constructed according to this embodiment typically makes it possible to receive transverse forces, such as for example in the case when a lateral collision of the motor vehicle occurs. The connecting bar is therefore designed not to be deformed in the case of a lateral collision of the motor vehicle, or not to become compressed with respect to its extent between the receiving parts.

It goes without saying that geometrically comparable simple constructions are also possible, for example with a rod profile, or particularly with a circular, round or rectangular profile design of embodiments of corresponding connecting bars, which create corresponding passageway possibilities based already on their measurements and/or arrangement for at least one vehicle-side structural component. Specifically, a corresponding vehicle-side structural components may extend in the direction of the longitudinal axis of the motor vehicle, for example above or below a corresponding bar-shaped or cuboidal connecting bar, between the respective receiving parts.

At least one connecting bar may form a part of a receiving frame used to receive at least one receiving part. A corresponding receiving frame should be considered a separate structural component for the reception or storage of at least one receiving part. The receiving frame can increase the mechanical stability of the receiving device, in particular with lateral collisions of the motor vehicle.

Basically, it is possible that at least one connecting bar, generally in the state when the receiving device is arranged in the vehicle-side subfloor extends on the side facing the bottom side between respective receiving devices on the bottom side facing the road surface, or when it extends between respective receiving parts in the state when it is arranged on the vehicle-side upper side facing the car body. The connecting bar can be also on one side attached, especially with its free end, to a bottom side or upper side of a receiving part, and on the other side, in particular with its opposite free end, it can be attached to a lower side or upper side of another receiving part.

Of course, a diagonal course of a corresponding connecting bar is also conceivable between the receiving parts. However, it is also possible that a connecting bar may extend in the state in which the receiving device is disposed in the subfloor on the vehicle side facing the bottom side between a first receiving part and another receiving part in the state in which the receiving part is arranged in the vehicle-side sub-floor with the structure of the vehicle body facing the upper part. This is applicable in particular to rod-shaped profiles of connecting bars.

As was already mentioned, the subfloor can be provided with separate regions available for the arrangement of respective receiving parts. To make it possible to create an arrangement incorporating an arrangement of corresponding receiving parts in as concise manner as possible in the sub-floor, the subfloor can be provided with at least one recess, which is adapted for a fitting accommodation of one or more receiving parts. The form and the shape of such a recess on the sub-floor side is then matched to the form and shape of at least one receiving part to be arranged therein so that the latter can be arranged in the sub-floor in a concise manner, i.e. in particular so that it does not protrude (substantially) in the direction of the road surface, and thus it does not reduce (substantially) the floor area between the road surface and the motor vehicle. The or a recess created in the subfloor of a motor vehicle is therefore matched in this manner to the form and shape of at least one of the receiving parts to be accommodated therein, so that the accommodated receiving parts are integrated flush with the bottom side of the subfloor of the motor vehicle. A typically closed subfloor of the motor vehicle is thus created.

At this point it should be generally noted that the receiving parts are typically provided with corresponding attachment sections that can be attached by themselves, or with a fixing means such as a screw, for example constructed in the form of latching/snap-on elements, through which the receiving parts can be created on the body of the motor vehicle so that they are arranged in the region of the sub-floor. In general, the receiving parts can be attached with a form-fitting and force-fitting design to the body of the motor vehicle, while their attachment can be also realized also with an adhesive or with welded joints.

Furthermore, it was mentioned above that the receiving parts are preferably arranged so that their position relative to the longitudinal axis of the motor vehicle is preferably in the region of the sub-floor below the front seat of the vehicle. In this case it is advantageous when at least one receiving part in the state when the receiving device is arranged in the vehicle-side subfloor is has a flatter design in the front region relative to the longitudinal axis of the motor vehicle than in the rear region relative to the longitudinal axis of the motor vehicle. The rear region serves in particular for accommodation of corresponding energy storage cells, so that these cells can be arranged directly below the front seat. The relatively flatter front region serves in particular for accommodation of corresponding structural components cells that have a comparatively flatter design, such as for example electronic components of the energy storage devices. With a similar construction and arrangement of the receiving parts, lowering of the floor can be realized in the inner space of the motor vehicle, which is useful for a higher position of the heels and thus advantageous for an ergonomic seating position of the occupants of the motor vehicle, in particular of the driver.

In order to achieve a sufficient protection of the corresponding receiving parts of the respective electrical or electronic components accommodated in these receiving parts, for example in the case of a lateral collision, and to realize necessary mechanical requirements, it is possible to provide at least one side rail structure extending in the direction of the longitudinal axis of the motor vehicle, which is divided at least partly into two side rail segments, so that these longitudinal side rail segments extend in the state when they are arranged in the vehicle-side subfloor in the direction of the side surface of a receiving part along longitudinal axis of the vehicle. The protection of the receiving parts mentioned above, or of the structural components accommodated in these part against mechanical stress, is realized by dividing the task assignment of a corresponding side rail structure into at least two longitudinal structure segments. The side rail structure segments, which are typically exposed to high mechanical stress, surround the receiving parts in the direction of the longitudinal axis as if creating an enclosure. A side rail structure segment located further away with respect to the longitudinal central axis of the motor vehicle can serve as the main load path, while a side rail structure segment located more inside the side rail structure segment can serve as an auxiliary load path.

The invention further also relates to a receiving device for receiving several electrical energy storage cells comprising an energy storage device supplying electrical energy to at least one vehicle-side electrical consumer, forming electrical energy storage cells for a motor vehicle as described above. The receiving device is therefore characterized by at least two separate receiving portions for receiving electrical energy storage cells, wherein these at least two receiving portions are connected through at least one of the two connecting portions between these extended connecting bars, wherein in and/or on at least one connecting bar is provided at least one line connection for an electrical connection of at least one energy storage cell accommodated in respective receiving parts, and/or for guiding a temperature-control fluid used to control temperature in the respective receiving portions accommodating the energy storage cells.

BRIEF DESCRIPTION OF THE DRAWINGS

Further advantages, features and details of the invention will become evident from the embodiments described below, as well as from the attached drawings which show.

DETAILED DESCRIPTION OF THE DRAWINGS

The illustration of the principle of the invention shown in FIGS. 1-5 indicate a vehicle-side, which is to say capable of being built or already built into a motor vehicle 1, receiving device 2 for accommodation of electrical energy storage cells 3 according to an embodiment of the invention.

Figure 1:
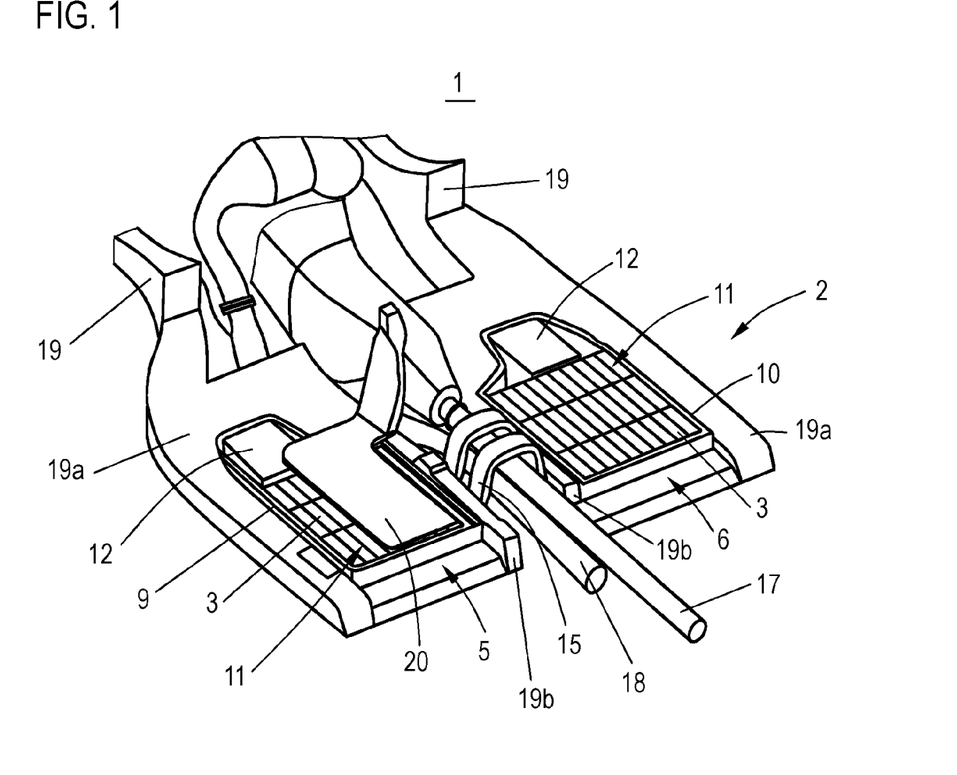
FIG. 1 illustrates a partial perspective view of an exemplary embodiment of a vehicle-side receiving device for accommodation of electrical energy storage cells.
Figure 2:
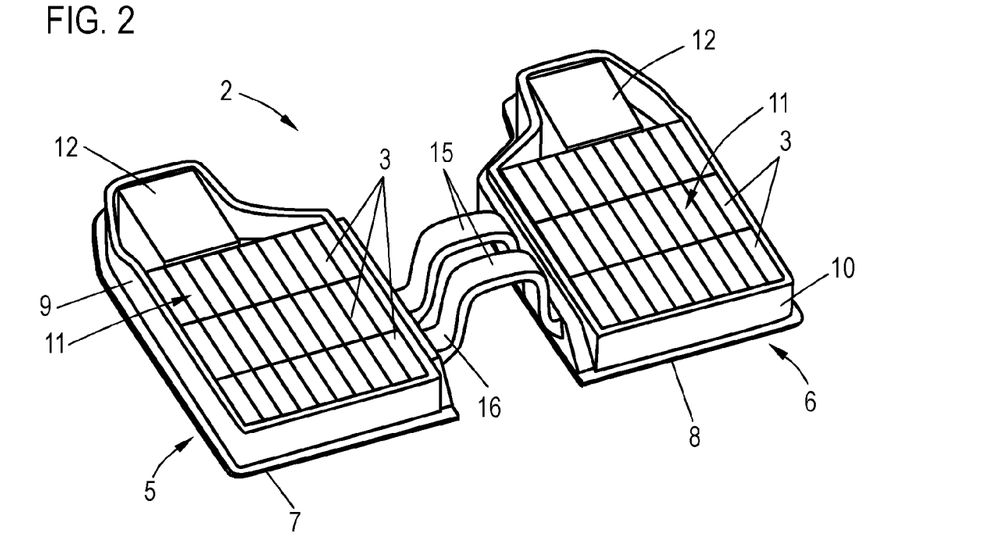
FIG. 2 illustrates a perspective detailed view of an exemplary embodiment of a vehicle-side receiving device for accommodation of electrical energy storage cells.
Figure 3:
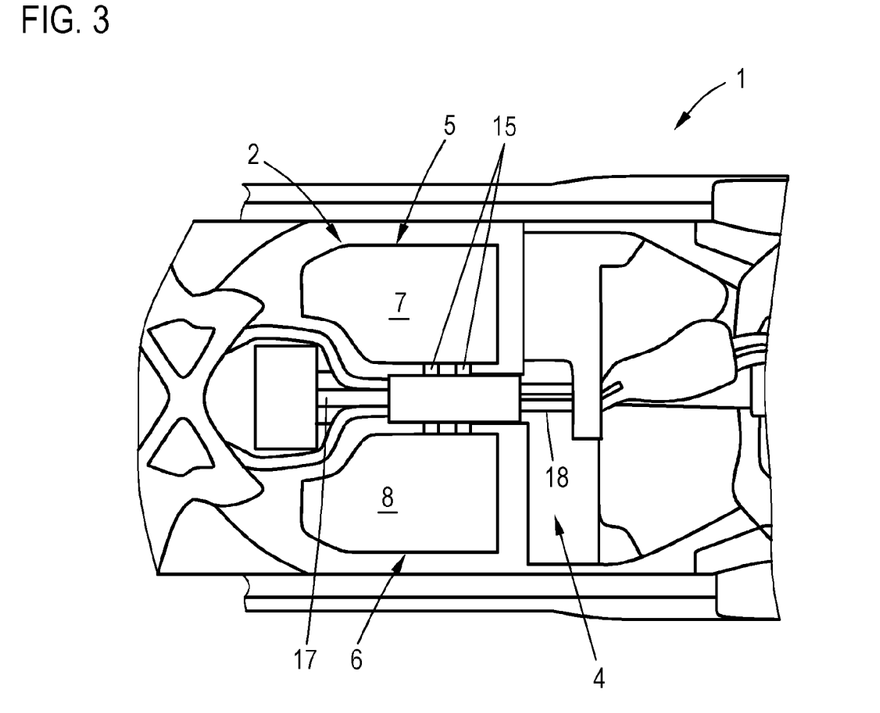
FIG. 3 illustrates a top view of an exemplary embodiment of a vehicle-side receiving device for accommodation of electrical energy storage cells.
Figure 4:
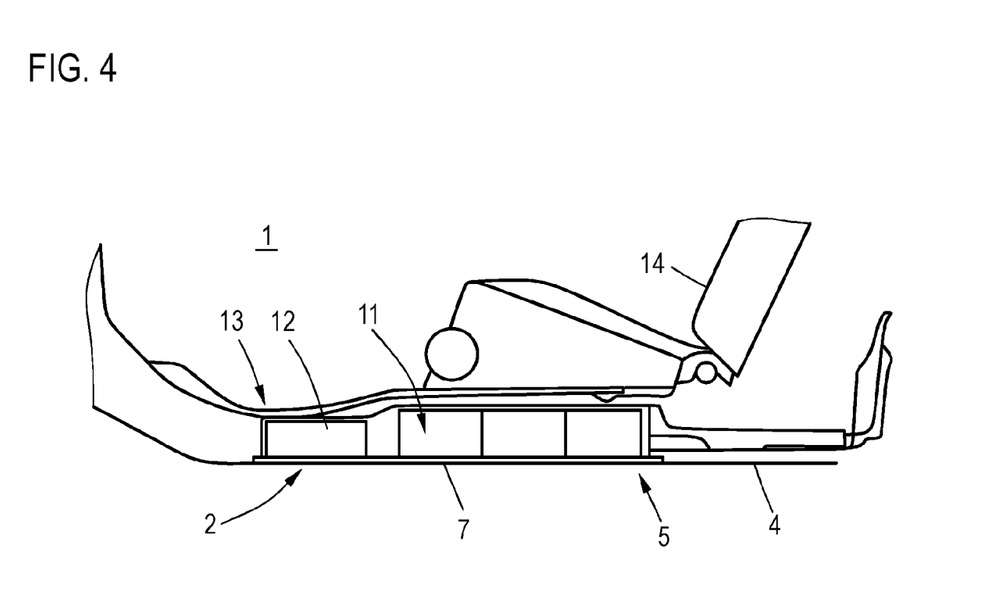
FIG. 4 illustrates a side elevation view of an exemplary embodiment of a part of a vehicle-side receiving device for accommodation of electrical energy storage cells.
Figure 5:
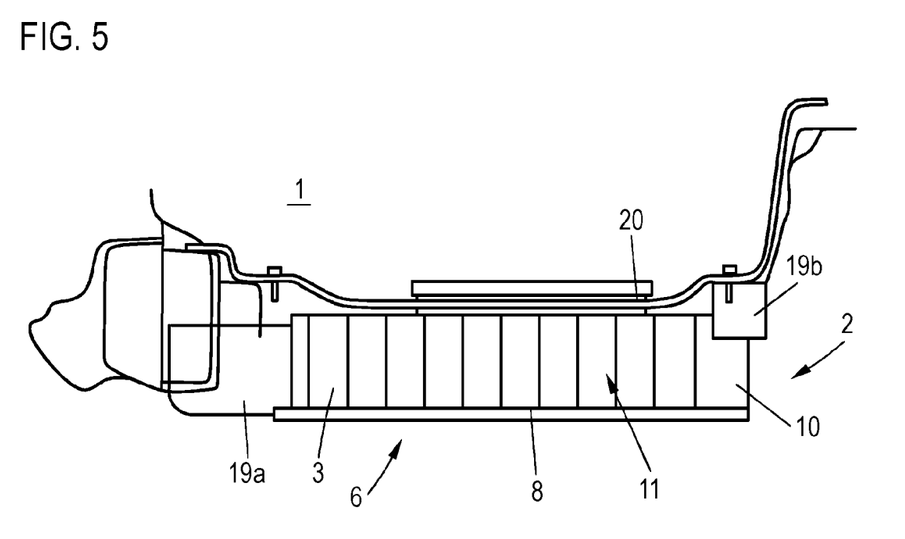
FIG. 5 illustrates a front view of an exemplary embodiment of a part of a vehicle-side receiving device for accommodation of electrical energy storage cells.

As one can see from FIG. 1, the figure shows a partial perspective view of a receiving device 2 that is built into a motor vehicle 1. FIG. 2 shows a perspective detailed view of the receiving device 2, FIG. 3 shows a top view of a receiving device 2, which is built into a motor vehicle 1 so that it is arranged in the sub-floor 4 of the motor vehicle 1, FIG. 4 shows a side elevation view in an illustration of a part of the receiving device 2 with a view in the direction of the transverse axis of the motor vehicle 1, and FIG. 5 shows a front view of an illustration of a part of the receiving device 2 with a view in the direction of the longitudinal axis of the motor vehicle 1.

The receiving device 2 is basically used to accommodate an energy storage device supplying electrical energy to a vehicle-side electric consumer (not shown), wherein these can be both energy storage cells 3 for a high-voltage consumer, such as for example a drive unit or a part forming such a electrical machine, and a low voltage consumer, such as for example multimedia or air conditioning devices. The energy storage cells 3 can be based for example on lithium or a lithium compound. A certain number of respective energy storage cells 3 is typically combined with a modular design, which is to say to form a cuboidal form of an energy storage module 11.

It is evident that the receiving device 2 has two separate receiving parts 5, 6. The receiving parts 5, 6 are designed and arranged symmetrically with respect to the longitudinal axis of the motor vehicle 1 (see in particular FIGS. 2 and 3). The symmetrical construction of the receiving portions 5, 5 means that these parts have mirror-symmetrical right and left parts.

The receiving parts 5, 6 are arranged respectively in the sub-floor 4 of the motor vehicle 1 and fastened therein for example with screw connections. The subfloor 4 of the motor vehicle 11 is provided with recesses in which the receiving parts 5, 6 can be fittingly arranged. The subfloor-side recesses are thus matched in their form and dimensions to the receiving parts 5, 6. The subfloor-side recesses are in particular matched in form and shape to these receiving arranged or to be arranged parts 5, 6 that parts 5, 6 with their respective bottom part 7, 8 are integrated flush in the remaining sub-floor 4 of the motor vehicle 1 (see FIG. 4, 5). This means that a substantially closed form of the sub-floor of the motor vehicle 1 is created in this manner (see FIG. 4, 5).

As is evident in particular from FIG. 2, the receiving device 2 is provided with two separate receiving parts 5, 6. The receiving parts 5, 6 are designed and arranged symmetrically with respect to the longitudinal axis of the motor vehicle 1 (see in particular FIG. 2, 3). The result of the symmetrical design is that a right-left parts are obtained with mirror symmetry.

As is evident in particular from FIG. 2, each receiving part 5, 6 is provided with a bottom side 7, 8 creating a bottom surface and angular, in particular vertically projecting walls 9, 10 creating side surfaces. This results in a kind of a frame structure of the receiving parts 5, 6. The bottom side 7, 8 is facing the road surface of the motor vehicle 1 in the state when the receiving device 2 is arranged in the subfloor 4 (FIG. 3). The edges delimiting the bottom side 7, 8 can be provided with a seal, in particular completely encircling the edges.

The bottom sides 5, 6 and the wall 9, 10 delimit the volume available for receiving energy storage cells 3 on the receiving side, as well as other electrical and electronic components of the energy storage cells. Optionally, the volume available for reception on the side of the receiving parts can be closed in the upper side with a covering component (not shown). As can be seen from the figures, the energy storage cells 3 are grouped with a modular design so that they are arranged in a rear region of the volume available for reception on the receiving side. In a front region of each receiving-side volume available for reception are arranged electronic components 12 (not shown), such as for example a control device controlling the charging and discharging operation of the energy storage cells 3.

As is shown in particular in FIG. 2, 4, the energy storage cells are in the state when the receiving device is arranged in the subfloor 4 of the motor vehicle located directly below the front seat 14 of the motor vehicle 1.

As shown in FIG. 2, 4, it if further evident that the walls 9, 10 of the receiving parts 5, 6 have different heights. The walls 9, 10 are during the state when the receiving device 2 is arranged in the vehicle-side subfloor 4 located in a front region of the motor vehicle 1 relating to the longitudinal axis of the vehicle, in which are located the energy storage cells 3 or energy storage cell modules 11. Such a configuration of the walls 9, 10 of the receiving parts 5, 6 makes it possible to lower the bottom 13 in the inner area of the vehicle so as to realize a relatively low position for the point of the rising heels.

The receiving parts 5, 6 should be essentially regarded as separate structural components because they delimit respective separate accommodation volumes.

At the same time, the receiving parts 5, 6 extending between the connecting bars 15 are mutually connected to each other (see in particular FIG. 2). The connecting bars 15 are set with one free end shown in FIG. 2 at the left receiving part 5, and with the free end on the opposite side they are set at the right receiving part 6 as shown in FIG. 2. The connecting bars 15 are deployed parallel to the transverse axis and thus transversely to the longitudinal axis of the motor vehicle 1.

In addition to the mechanical connection of the receiving parts 5, 6, the connecting bars 15 also enable the exchange of electrical energy, and of a temperature-control fluid, for example water, used to control the temperature in the components accommodated in respective receiving parts 5, 6, in particular of energy storage cells 3, between the receiving parts 5, 6. In or inside the connecting bar 15 are therefore formed line connections 16 supplying electrical energy, which are only schematically indicated here, in order to create an electrical connection for the energy storage cells 3 accommodated in respective receiving parts 4, 6, and line connections 16 for guiding a corresponding temperature-control fluid. The connection bars 15 are therefore not provided with the channels structures indicated for receiving or for development of corresponding line connections 16. Corresponding channel structure typically extend in the longitudinal direction within the connecting bars 15.

As one can see in the figures, the connecting bars 15 extend with a curved shape creating a U-shaped form between the receiving parts 5, 6 relative to their respective longitudinal axis or longitudinal extent. Since the respective connecting bars 15 are set in the region of the bottom sides 7, 8 of the receiving parts 5, 6, the curvature of the connecting bars 15 is indicated in the direction of the road surface (see FIG. 1, 2). Relative to the U-shaped form mentioned above, the connecting bars 15 thus form a reversed "U" shape. The connecting bars 15 therefore create a free space in this manner and thus also the possibility for a passageway for at least one vehicle-side structural component, in this case for a structural component belonging to a vehicle-side drive train in the form of a drive shaft 17, and for structural component in the form of an exhaust pipe 18 belonging to a vehicle-side exhaust system.

It would be essentially also possible to create the curvature of the connecting bars 15 in the direction of the structure of the vehicle body. In this case, the connecting bars would not be fixed to the bottom sides 7, 8 of the receiving parts 5, 6, but instead they would be fixed in the region of the free ends to the walls 9, 10 of the receiving parts 5, 6. The connecting bars 15 would then form a correct U-shape.

Regardless of the orientation of the curvature of the connecting bars 15, which is to say regardless of whether the curvature is created in the direction of the road surface, or in the direction of the structure of the vehicle body, the connecting bars 15 are typically not designed to absorb transverse forces, such as those occurring in the case of a lateral collision of the motor vehicle 1. Instead, the connecting bars 15 are designed in such a way so that they will be deformed, or that they will be compressed with respect to their extent between the receiving parts 5, 6.

However, protection of the receiving parts 5, 6 or for electrical or electronic components accommodated in them is still provided through the special design shown in FIG. 1, 5 of the vehicle body structure. The special design of the vehicle body structure is determined by the side rail structures 19 extending along the longitudinal axis of the motor vehicle 1, which can be divided or split into sections having at least two side rail structural segments 19a, 19b. The side rail structural segments 19a, 19b extend in particular along respective side surface of the receiving parts 5, 6, in particular in the direction of the longitudinal axis of the motor vehicle 1. The side rail structure segments, which are typically subject to mechanically demanding requirements, surround the receiving parts 5, 6 in the direction of the longitudinal axis of the motor vehicle 1, thus creating a type of an enclosure in this manner.

In connection with the embodiment shown in FIG. 1 through 5, it should be also noted that FIG. 1 additionally shows a ventilation member 20, which, however, is not essential for the principle described here.

Figure 6:
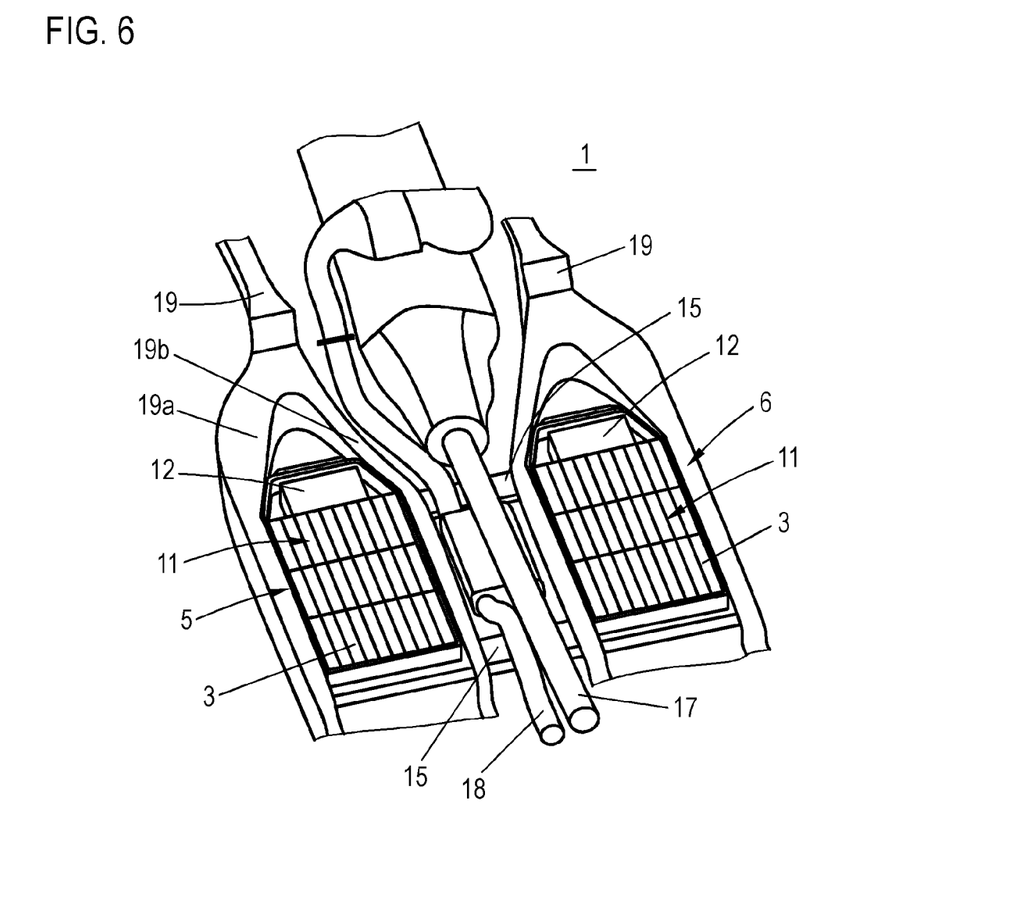
FIG. 6 illustrates a partial perspective view of an exemplary embodiment of a vehicle-side receiving device for accommodation of electrical energy storage cells.
Figure 7:
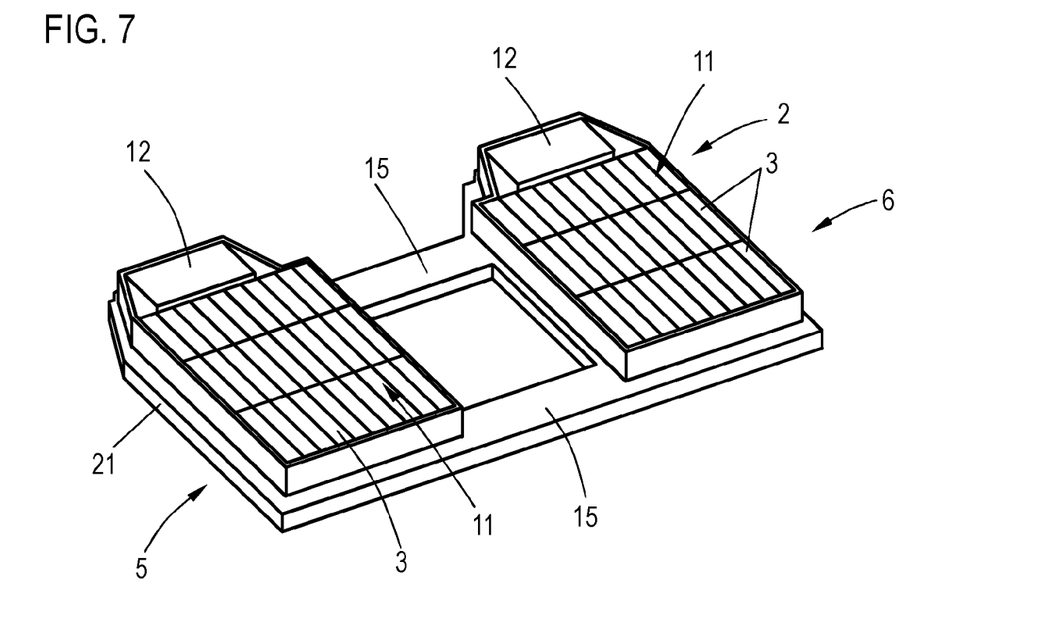
FIG. 7 illustrates a detailed perspective view of an exemplary embodiment of a vehicle-side receiving device for accommodation of electrical energy storage cells.

The schematic illustrations of FIG. 6, 7, indicate the principle of the invention, i.e. a receiving device 2 that can be built or is built into a motor vehicle 1 for accommodation of electrical energy storage cells 3 according to another embodiment of the invention. As shown in the figures, FIG. 6 is a partial perspective illustration of a receiving device that is built into a motor vehicle 1, and FIG. 7 shows a detailed perspective view of the receiving device 2.

An essential difference from the embodiments that were described up until now is the form of the connecting bar 15 is not curved here, but has a planar design. As shown in the figures, the connecting bars 15 here form a part of a receiving frame 21 that accommodates the receiving parts 5, 6. A possible passageway for corresponding vehicle-side structural components is also provided because they can extend above the connecting bar 15 in the direction of the longitudinal axis of the motor vehicle 1 (see FIG. 6).

The connecting bars 15 are here adapted to absorb transverse forces, which can occur for example in the case of a lateral collision of the motor vehicle 1, and eventually to guide them into the receiving frame 21. The connecting bars 15 are therefore designed not be deformed in case of a lateral collision of the motor vehicle 1, so that the dimensions of the possible passageway remain unchanged as much as possible and the vehicle-side structural components extending between the receiving parts 5, 6 remain intact as much as possible.

Figure 8:
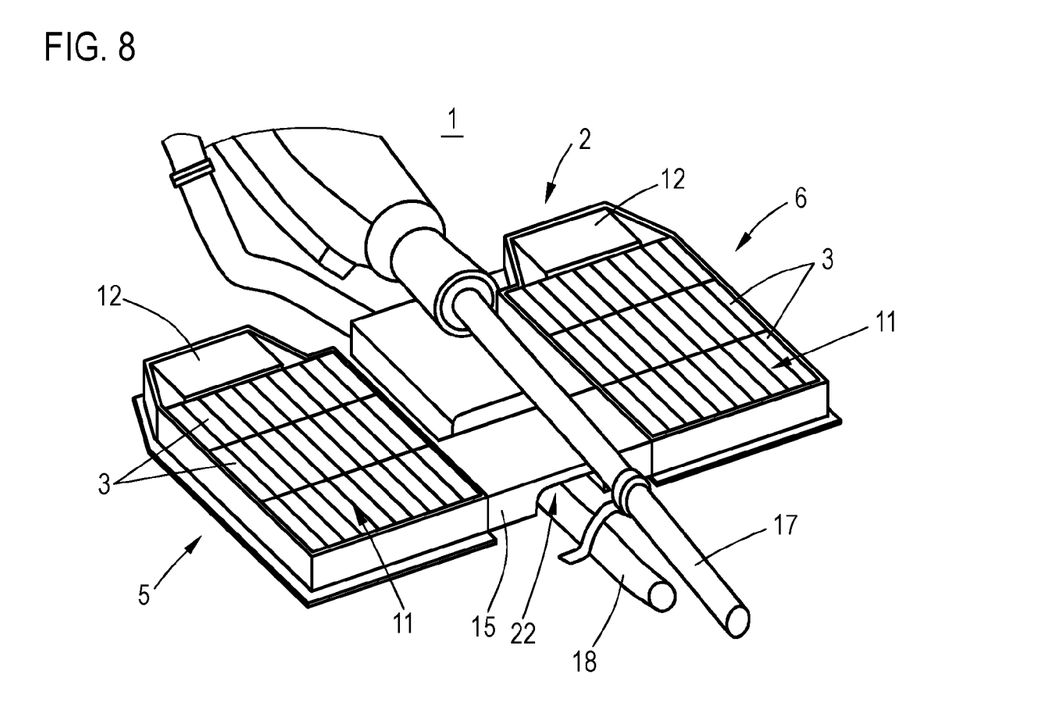
FIG. 8 illustrates a partial perspective view of an exemplary embodiment of a vehicle-side receiving device for accommodation of electrical energy storage cells.
Figure 9:
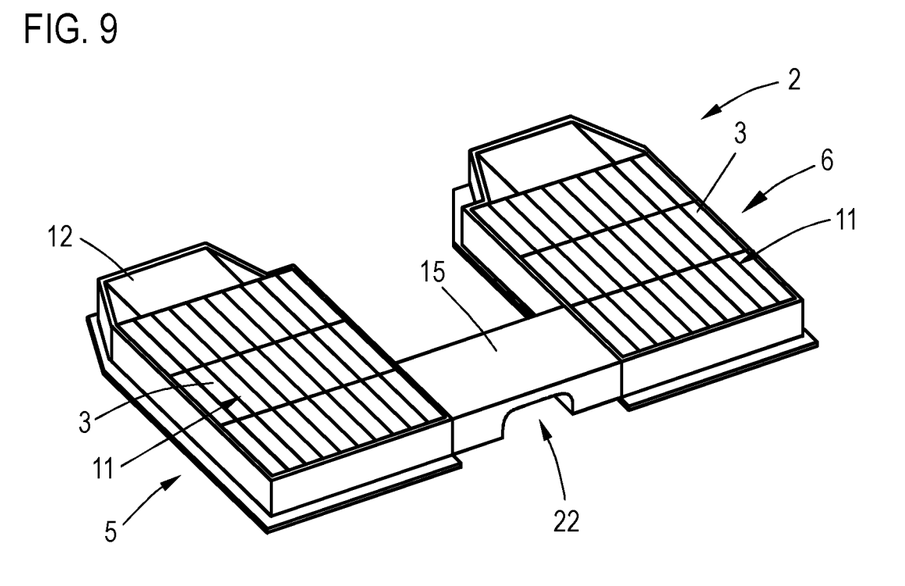
FIG. 9 illustrates a detailed perspective view of an exemplary embodiment of a vehicle-side receiving device for accommodation of electrical energy storage cells.

FIG. 8, 9 are schematic diagrams explaining the principle of a receiving device 2 that can be or is built into a vehicle-side device, which is to say into the vehicle 1 to accommodate electrical energy storage cells 3 according to another embodiment of the invention. As shown in the figures, FIG. 8 shows again a partial perspective view of a receiving device that is built into a motor vehicle 1, and FIG. 9 shows a detailed perspective view of the receiving device 1.

An essential difference from the embodiments shown in the previous figures is again here the form of the single connecting bar 15. It is of course also conceivable to provide a plurality of corresponding connecting bars 15. The connecting bar 15 is provided with a recess 22 that forms a through-opening between the receiving parts 5, 6 transversely to its longitudinal axis or to its longitudinal extent. The through-opening again forms or delimits a possible passageway for corresponding vehicle-side structural components. The connecting bar 15 is again a planar, in particular cuboid structural member, which is comparable to a bridge and which is provided with a recess 22. The through-opening is here indicated in the direction of the road surface. It goes without saying that it is also conceivable that the arrangement of the connecting bar 15 could be also rotated by 180° about the transverse axis of the motor vehicle 1.

The connecting bar 15 is also designed to absorb transverse forces, such as those that occur in case of a lateral collision of the motor vehicle 1. The connecting bar 15 is thus also designed in such as way that it will not be deformed in case of a lateral collision of the motor vehicle 1, so that the dimensions of the possible passage will remain unchanged as much as possible and the structural components extending between the receiving parts 5, 6 remain will remain intact as much as possible.

Typically corresponding segmented side rail structures 19 are obviously also possible, although they are not shown in the embodiments illustrated in FIG. 8, 9.

One aspect that is applicable to all the receiving devices 2 shown in the figures is that they are provided with respective connections (not shown) provided to connect corresponding electrical consumers, or a temperature-control device for the introduction of a temperature controlling fluid in connection with the receiving device 2. The connections can be arranged or formed for example in the region of the front end faces of the receiving parts 5, 6.

Furthermore, the respective receiving parts 5, 6 are provided with at least one temperature fluid channel structure (not shown) through which a temperature-controlling fluid can flow. The temperature-controlling fluid channel structure can be for example integrated in the walls 9, 10 of a corresponding receiving part 5, 6, so that a corresponding receiving part 5, 6 can run at least partially through the structure.

Finally, it should be also noted that the receiving parts 5, 6 shown in the figures can be formed from metal or from a plastic material. The embodiment that is made of metal, such as for example aluminum or steel, can necessitate electrical insulation of the receiving parts 5, 6, which can be realized for example by means of an electrically insulating coating. For the embodiment that is made of a plastic material can be used in particular technical plastic materials that are highly stable, in particular fiber-reinforced plastics. In any case, the receiving parts 5, 6 and the connecting bars 15 connecting them can be produced as one piece.

The invention claimed is:

1. A motor vehicle, comprising;
   at least one of several electrical energy storage cells having an electrical storage device for supplying electrical energy to a vehicle-side electrical energy user; and
   at least one receiving device that is arranged in the subfloor of the motor vehicle for accommodating electrical storage cells, which have at least two separate receiving parts for accommodation of electrical energy storage cells, wherein the at least the two receiving parts are connected via at least one connecting bar extending between them and set on respective bottom sides of the at least two receiving parts, wherein a line connection is formed within the at least one connecting bar to create a line connection for the electrical energy storage cells accommodated in respective receiving parts and at least one other line connection is formed within the at least one connecting bar for guiding a temperature-control fluid for controlling temperature of the energy storage cells accommodated in respective receiving parts,
   at least one side rail structure is extending in the direction of the longitudinal axis of the motor vehicle, which is divided at least in sections into at least two side rails segments, wherein the side rail segments are extended in the state when the receiving device is arranged in the vehicle-side subfloor at least along the respective side surfaces respectively extending in the direction along the side surfaces of a receiving parts in the longitudinal direction of the motor vehicle,
   wherein the at least one connecting bar is provided with a recess forming a through-opening running transversely to its longitudinal axis, wherein the recess creates a passageway for a vehicle-side structural component, at least one of a vehicle-side drive train or a structural component belonging to a vehicle-side exhaust system.

2. The motor vehicle according to claim 1, wherein the at least one connecting bar is arched relative to its longitudinal axis to provide the passageway.

3. The motor vehicle according to claim 1, wherein the at least one connecting bar is arranged on the vehicle-side subfloor with a bottom side proximate a road surface.

4. The motor vehicle according to claim 1, wherein the at least one connecting bar is arranged on the vehicle-side subfloor with an upper side proximate the vehicle body.

5. The motor vehicle according to claim 1, wherein at least one recess is formed in the subfloor of the motor vehicle for accommodation of one of the receiving parts.

6. The motor vehicle according to claim 5, wherein the recess created in the subfloor of the vehicle is adapted in such a way that the accommodated one of the receiving parts is integrated flush with a bottom side in an underside of the motor vehicle.

7. The motor vehicle according to claim 1, wherein the receiving device is or can be arranged in a region of the subfloor of the motor vehicle located below a front seat of the motor vehicle.

8. The motor vehicle according to claim 1, wherein at least one receiving part is during the state when the receiving device is arranged in the vehicle-side subfloor with a flatter design in a front region relative to the longitudinal axis of the motor vehicle than in a rear region relative to the longitudinal axis of the motor vehicle.

9. The motor vehicle according to claim 1, wherein the at least one connecting bar forms a part of a receiving frame for receiving at least one receiving part.

* * * * *